United States Patent
Lin

(10) Patent No.: US 8,549,594 B2
(45) Date of Patent: Oct. 1, 2013

(54) METHOD OF IDENTITY AUTHENTICATION AND FRAUDULENT PHONE CALL VERIFICATION THAT UTILIZES AN IDENTIFICATION CODE OF A COMMUNICATION DEVICE AND A DYNAMIC PASSWORD

(76) Inventor: Chung-Yu Lin, Kaohsiung (TW)

( * ) Notice: Subject to any disclaimer, the term of this patent is extended or adjusted under 35 U.S.C. 154(b) by 366 days.

(21) Appl. No.: 12/884,864

(22) Filed: Sep. 17, 2010

(65) Prior Publication Data

US 2011/0072499 A1      Mar. 24, 2011

Related U.S. Application Data

(60) Provisional application No. 61/243,566, filed on Sep. 18, 2009.

(51) Int. Cl.
*H04L 29/00*      (2006.01)
(52) U.S. Cl.
USPC .............. 726/6; 713/155; 713/156; 713/157; 713/158; 713/159
(58) Field of Classification Search
USPC .......................................................... 726/6
See application file for complete search history.

(56) References Cited

U.S. PATENT DOCUMENTS

| | | | |
|---|---|---|---|
| 6,880,079 B2 | 4/2005 | Kefford et al. | |
| 6,950,949 B1 | 9/2005 | Gilchrist | |
| 7,519,989 B2 | 4/2009 | Lin et al. | |
| 2007/0186115 A1* | 8/2007 | Gao et al. | 713/184 |
| 2009/0055910 A1* | 2/2009 | Lee | 726/6 |

* cited by examiner

*Primary Examiner* — Ghazal Shehni
(74) *Attorney, Agent, or Firm* — Bacon & Thomas, PLLC

(57) ABSTRACT

A method of identity authentication and fraudulent phone call verification uses an identification code of a communication device and a dynamic password. The "dynamic password" is directly sent to an Internet user via a dynamic web-page of a specific website instead of by means of a traditional telephone short message. Thus, the "dynamic password" cannot be copied from the spyware infected communication device of the Internet user. Furthermore, even if the "dynamic password" is intercepted or otherwise discovered by a hacker or intruder, authentication is still secure because the dynamic password must be sent back to the specific website via a short message or the like from the same communication device having the corresponding identification code that was initially input by the Internet user in order to generate the dynamic password.

18 Claims, 6 Drawing Sheets

METHOD OF IDENTITY AUTHENTICATION AND FRAUDULENT PHONE CALL VERIFICATION THAT UTILIZES AN IDENTIFICATION CODE OF A COMMUNICATION DEVICE AND A DYNAMIC PASSWORD

This application claims the benefit of provisional U.S. Patent Application No. 61/243,566, filed Sep. 18, 2009.

FIELD OF THE PRESENT INVENTION

The present invention relates to a method of identity authentication and fraudulent phone call verification that utilizes an identification code of a communication device and a dynamic password to provide a higher security level than is possible with a conventional authentication method that only utilizes a dynamic password. A particular advantage of the invention is that it is easier to use and more likely to be accepted by Internet users, although those skilled in the art will understand that the invention is not limited to applications involving the Internet.

According to preferred embodiments of the present invention, when an Internet user visits a specific website, the Internet user can view a dynamic password that may subsequently be voluntarily transmitted by the Internet user back to a server of the specification website via a message (such as a short message or SMS from the Internet user's communication device (such as a cellular phone), for authentication by matching not only the dynamic password received via the message sent by the Internet user, but also the identification code of the user's communication device from which the message was sent (this is in contrast to the conventional dynamic password method of having an authentication server send a dynamic password to the Internet user via short message for direct input by the Internet user to the specific website being visited).

According to another preferred embodiment of the present invention, when a company or other party calls a cellular phone to a telephone call recipient, it also sends the communication device identification code of the telephone call recipient to a specific website which then generates a dynamic password and transmits it to the communication device so that the caller can be verified by the telephone call recipient by transmitting the dynamic password via short message from the telephone call recipient's cellular phone to a message receiver of the specific website for authentication, by matching of the dynamic password received from the telephone call recipient with the generated dynamic password, and the identification code of the telephone call recipient's communication device with the identification code provided by the caller.

BACKGROUND OF THE INVENTION

Internet shopping, network online games, network financial transactions, electronic commercial activities and the like have recently become indispensable or prevalent in people's daily lives. However, at the same time, malicious disruptive behaviors or sabotage by cyber hackers has also become more prevalent. These disruptive behaviors or sabotage can be classified into following categories:

1. Malicious Use of Trojan Horse Programs: Trojan horse, or Trojan, programs are malware that appears to perform a desirable function for the user but instead facilitates unauthorized access of the user's computer system. In computer science, the Trojan horse is a program that appears to be legitimate but is designed to have destructive effects. For example, the Trojan horse may be used to steal password information, make a system more vulnerable to future unauthorized entries, or simply destroy the programs or data on a hard disk. Once a Trojan horse is installed on a target computer system, a hacker may access the computer remotely and perform various operations including:

Use of the machine as a part of a botnet to perform automated spamming;

Data theft such as retrieving passwords or credit card information;

Installation of software, including third-party malware;
Downloading or uploading of files on the user's computer;
Modification or deletion of files;
Keystroke logging;
Watching the user's screen;
Wasting the computer's storage space; and crashing the computer.

2. Phishing Scams: In the field of computer security, phishing is the criminally fraudulent process of attempting to acquire sensitive information such as usernames, passwords and credit card details by masquerading as a trustworthy entity in an electronic communication via forged email and a website that spoofs or appears to be that of a legitimate business in order to trick the victim into divulging personal confidential information such as banking account numbers, credit card information, and the like (this definition is from the Anti-Phishing Working Group (APWG), an industry and law enforcement association.

3. Man-in-the-Middle Attacks: In cryptography, the man-in-the-middle attack (MITM attack) is a form of active eavesdropping, in which the attacker makes independent connections with the victims and relays messages between them, making them believe that they are talking directly to each other over a private connection, when in fact the entire conversation is controlled by the attacker. The attacker is able to intercept all messages going between the two victims and inject new ones, which is straightforward in many circumstances so that the attacker can perform financial transactions with real banking websites while interactively gulling the victimized Internet user out of confidential information to incur monetary loss for the victimized Internet user.

In order to prevent damage from the above-listed types of network attacks, it has been proposed to use a countermeasure in the form of a dynamic One-Time Password (OTP), which is only valid for a single login session or transaction and therefore is less susceptible to replay attacks than a traditional memorized static password The OTP may be by an organization known as an "OTP dynamic password authentication unit." The main algorithm for the generation and delivery of OTP is based on randomness. The dynamic password is generated in an irregularly stochastic manner with a different password for each internet transaction of the internet user. If a potential intruder manages to record an OTP that has already been used to log into a service or to conduct a transaction, he or she will not be able to abuse it since it is no longer valid. As a result, even when a hacker successfully intercepts a used OTP, he/she cannot reuse the invalid used OTP or forecast a next valid new OTP to jeopardize the targeted Internet user. Therefore, the features of unpredictability, unrepeatability and one-time validity of the OTP make the OTP one of the most effective authentication solutions to solve the issues of identity authentication and preventing various cybercrimes carried out by hacker attacks via malware, phishing, spy-ware, man-in-the-middle (MITM), and the like. The conventional authentication method using a dynamic password is illustrated in FIG. 1 including the following steps:

A. An Internet user submits an enrollment application to become a member of an "OTP dynamic password authentication unit" to get an "account number" and "password" issued to the user;

B. The Internet user accesses any website associated with the "dynamic password authentication unit" by a website accessing browser and clicks on a "dynamic password authentication web-page";

C. The Internet user inputs the "account number" and "password" issued upon membership enrollment application into respective corresponding fields of "account number" and "password" in the "dynamic password authentication web-page";

D. After having received the "account number" and "password" input by the Internet user, the "OTP dynamic password authentication unit" will generate a set of "dynamic passwords" and make a phone call to transmit it via short message to the cellular phone designated by the Internet user for informing him or her of the current "dynamic password";

E. The Internet user then inputs his or her own current "dynamic password" into "dynamic password authentication fields" in the "dynamic password authentication web-page" of the online website, after having read the current "dynamic password" received from the short message on his/her cellular phone;

F. The online website will relay the "dynamic password" into a computer authentication system of the "OTP dynamic password authentication unit" to perform matching comparison with the "dynamic password" previously provided to the targeted Internet user via short message. During the matching comparison of the "dynamic password," the "dynamic password authentication web-page" of the online website will flag a phrase "login is successful" if no discrepancy is found, or a phrase "login has failed" if any discrepancy is found.

Although the above-described conventional dynamic password based authentication method has been adopted by some financial banks, online games and organizations since it was introduced and promoted, growth has been retarded since 2007 by the following bottlenecks:

1. Accessibility of cellular phones to the Internet has increased, making the dynamic password sent to the cellular phone more vulnerable. The first cellular virus "Cabir" and second cellular virus "CommWarrior" were created in June, 2004 and January, 2005 respectively. The "Cabir" virus causes an infected cellular phone to search and connect to a Bluetooth-enabled cellular phone nearby and send information to the connected cellular phone continuously, draining the battery as it keeps on seeking other Bluetooth connections. The "CommWarrior" virus is a cellular phone virus capable of replicating via Multimedia Messaging Service messages (MMS), which are text messages with images, audio or video data to be sent from one phone to another or via email. Before the arrival of "CommWarrior," cellular phone viruses only spread over Bluetooth, and thus only nearby cellular phones were to be affected, but the "CommWarrior" (MMS) virus can affect all the cellular phones and potentially spread as quickly as an email worm, results in expensive losses caused by continuous short message sending by the infected cellular phones. In July, 2007, the Spanish police bureau arrested the hacker, a man of 28 years of age, who created "Cabir" and "CommWarrior." There are over 115 thousand Symbian based smart phones affected by these two viruses.

After 2007, some cellular phone viruses were further improved to concealed themselves covertly. The Market Intelligence & Consulting Institute (MIC) of the Institute for Information Industry (Taiwan) points out that current cellular phone viruses are clever enough to hide themselves in a short message for propagation. Once a user opens the short message, this kind of malware is installed and runs quietly in the background to snatch and steal information in the affected cellular phone, and even to capture conversations covertly. Even worse, this kind of malware can copy or delete critical information such as a personal address book, short messages, calendar, bank account details, passwords and the like silently so that the user is not aware of it at all. Because each "dynamic password" in the above step D is transmitted to the Internet user via telephone short message, each "dynamic password" can be known by a hacker once he/she invades the cellular phone of the target Internet user by using spyware. Then, the hacker can easily pretend to be the target Internet user to cheat the authentication system of the "OTP dynamic password authentication unit" and defeat the function of the conventional dynamic password authentication method.

2. As described in the above step D, the "OTP dynamic password authentication unit" will generate a set of "dynamic password" and make a phone call to transmit it via short message to the cellular phone designated by the Internet user. The problem is that the expense for the short message is charged to an Internet Service Provider (ISP), which cooperates with the "OTP dynamic password authentication unit," and that, accordingly, the Internet Service Provider (ISP) is liable not only for the expense of normal short messages but also the extra expense of abnormal or invalid short messages incurred by malware issued from competitors and hackers. Consequently, the advantage of using the "OTP dynamic password authentication mechanism" is reduced due to the unpredictable extra expense and growth in using the conventional dynamic password authentication method has slowed.

3. Another problem is that, as described in the above step D, when the "OTP dynamic password authentication unit" generates a set of "dynamic passwords" and makes a phone call to transmit it via short message to the cellular phone designated by the Internet user, the OTP transmission uses the MT (Mobile Terminated) Mode, which is not guaranteed to be a real time and successful transmission, and can lead to a fatal authentication delay and/or mistake.

4. Furthermore, as described in the above step D, because the "OTP dynamic password authentication unit" generates a set of "dynamic passwords" and makes a phone call to transmit it via short message to the cellular phone designated by the Internet user, the Internet user must be in the status of receiving the "OTP short message" from anyone at anytime, which leads to a new fraudulent crime of "OTP short message phishing," in which the attacker constantly sends a fraudulent "OTP short message" to the victim constantly and causes the victim to panic, thinking that his/her Internet account or banking account is under attack. Then the attacker guides the victim to follow his orders to cheat the victim and get the victim's properties.

5. Finally, yet another problem with use of short messaging to transmit dynamic passwords has to do with tampering with the caller ID function of the telephone display. Ever since the Internet and the Public Switched Telephone Network (PSTN) have been interlinked together, most telephone frauds can be done by malware propagation via the Internet, in which hackers associate with fraudulent phone call gangsters to remotely fiddle with the "Caller ID" in the telephone display to cause the call to appear to be from a legitimate telecommunication company, law court, bank, procurement office or the like of a government agency, causing victims to let down their guard and install malware arranged to cheat the targeted victims and perform telephone fraud. Such telephone fraud happens again and again, and is getting worse to the point where it is becoming an overwhelming situation. It is extremely critical to find a way to control and stop these kinds of crimes.

SUMMARY OF THE INVENTION

Accordingly, a first object of the present invention is to provide a method of identity authentication and fraudulent phone call verification by utilizing an identification code of a communication device in addition to a dynamic password. This object is achieved, in accordance with the principles of a preferred embodiment of the invention, by a method in which the dynamic password is provided to the Internet user by the specific website for which authentication is sought rather than by a short message from an authentication server, and the dynamic password is transmitted by short message from the Internet user rather than to the Internet user, and the authentication is operated by matching of the dynamic password and identification code of the communication device rather than by matching of the dynamic password only. More particularly, the first object is achieved by the following steps:

a. For each access to a specific website via the Internet, cause an Internet user to select a communication device and input a corresponding proprietary identification code of the communication device thereof into a field for the identification code of the communication device to a dynamic web-page of the specific website;

b. A website server in the specific website will immediately generate a corresponding dynamic password and display it in a field for the dynamic password of the dynamic web-page, and in the meantime store both the identification code of the communication device and the dynamic password in an identifying and verifying database of the website server after having received the identification code of communication device;

c. The Internet user picks up the dynamic password transmitted from the field for the dynamic password and voluntarily transmits it from the communication device to a receiving terminal designated by the specific website via telephone short message mode; and d. After having received the telecommunicated short message from the communication device, the receiving terminal will actively sense the corresponding identification code of the communication device and transmit it, together with the dynamic password included in the telephone short message, to the identifying and verifying database of the specific website for matching comparison with counterparts of the identification code of communication device and the dynamic password stored in the identifying and verifying database; If no discrepancy is found, a phrase of "authentication is successful" or similar words will appear in the dynamic web-page of the specific website; while if any discrepancy is found, a phrase of "authentication has failed" or similar words will flag the failure in the same location.

In the above steps b and c, the "dynamic password" is directly sent to the Internet user via the dynamic web-page of the specific website instead of via a traditional telephone short message. Thus, a spyware like attack on the communication device (such as a cellular phone) of the Internet user by a hacker to get the "dynamic password" will be completely obviated.

Because the "dynamic password" is voluntarily transmitted by the Internet user in the above step c via telephone short message mode, rather than from a website to the Internet user, the Internet user is liable for the expense incurred while the Internet Service Provider (ISP) is free from such expense.

Accordingly, the Internet Service Provider (ISP) is also free from the extra expense of abnormal or invalid short message sending caused by malware issued from competitors and hackers. Consequently, the incentive to participate in the dynamic password authentication scheme is considerably enhanced.

Moreover, because in the above step d, the matching comparison of authentication in the present invention includes two items of "identification code of communication device" and "dynamic password," so that authentication will not occur if any one of these two items results in a discrepancy, the security level of the present invention is much higher than that of the conventional "dynamic password" authentication method.

Another object of the present invention provides a method of fraudulent phone call verification by identification code of the communication device and a dynamic password. This object is achieved by a method in which, when a telecommunication subscriber receives a phone call from customer service of certain telecommunication companies, law courts, banks, and the like, the telecommunication subscriber will also receive a "dynamic password" so that, if the telecommunication subscriber doubts that the received phone call is a legitimate call, he/she can relay the "dynamic password" to a designated authentication unit by the communication device that received the phone call to check the identification code of the communication device and the dynamic password via voice or short message. If the authentication succeeds, the received phone call is genuine. If the authentication fails, the received phone call is a fraudulent call. As a result, the telecommunication subscriber not only can easily judge whether the received phone call is fraudulent or not, but also can protect his/her privacy as only the telephone recipient has the communication device of the designated identification code to request the authentication check.

DETAILED DESCRIPTION OF THE PREFERRED EMBODIMENTS

Figure 1:
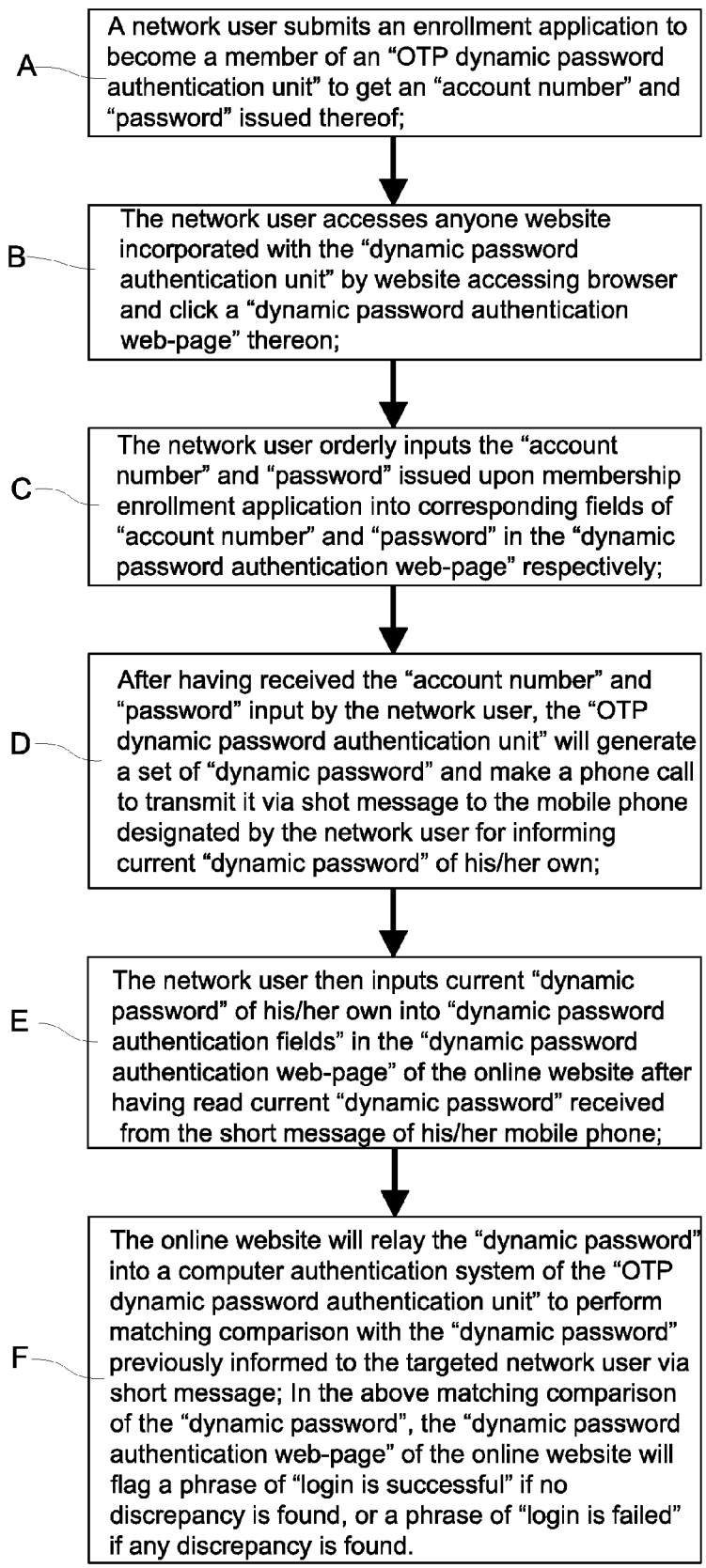
FIG. 1 is a flow chart showing procedural steps in a conventional dynamic password authentication method.
Figure 2:
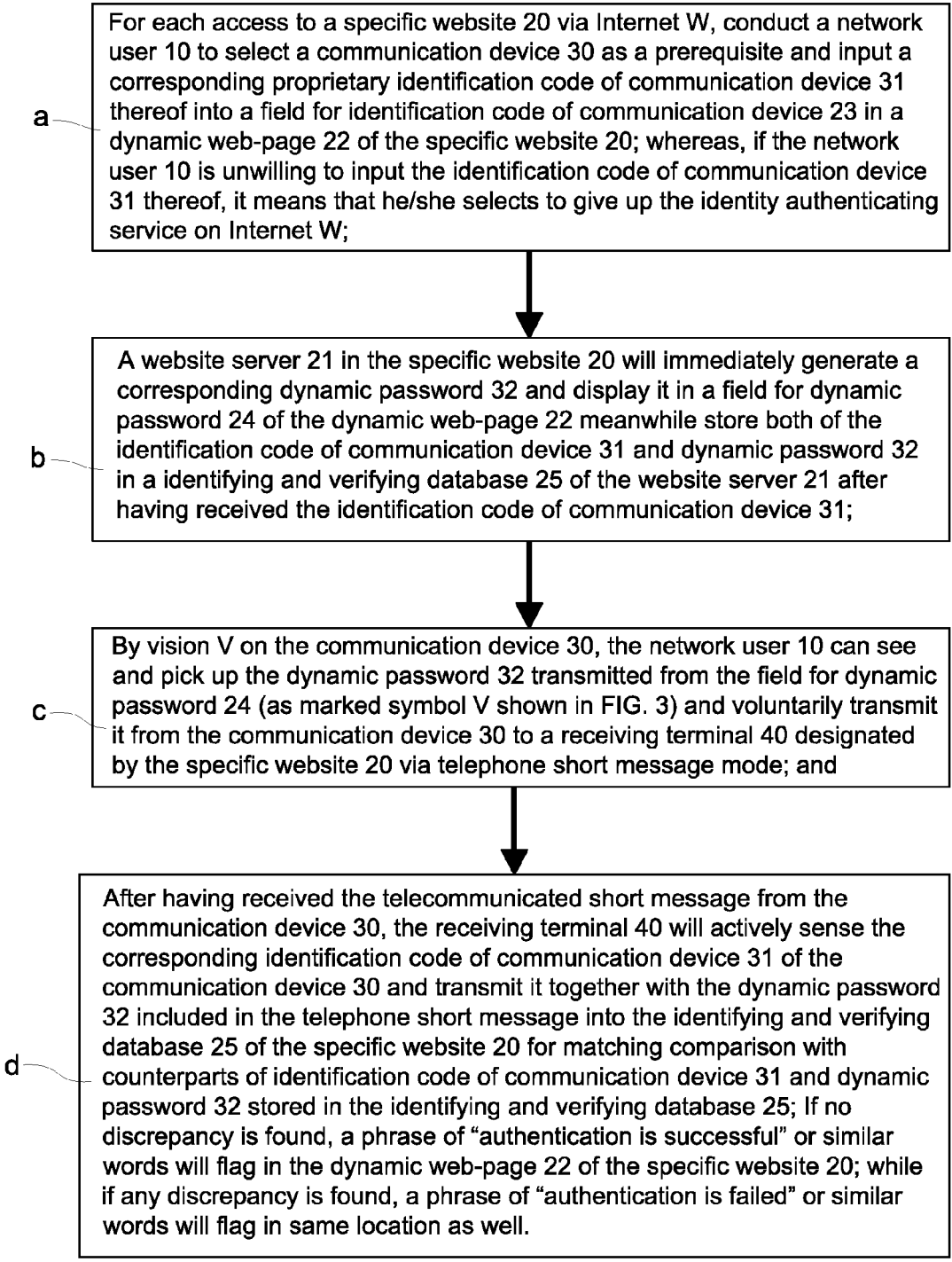
FIG. 2 is a flow chart showing procedural steps for a first exemplary embodiment of a method of identity authentication and fraudulent phone call verification by using the identification code of a communication device and a dynamic password.
Figure 3:
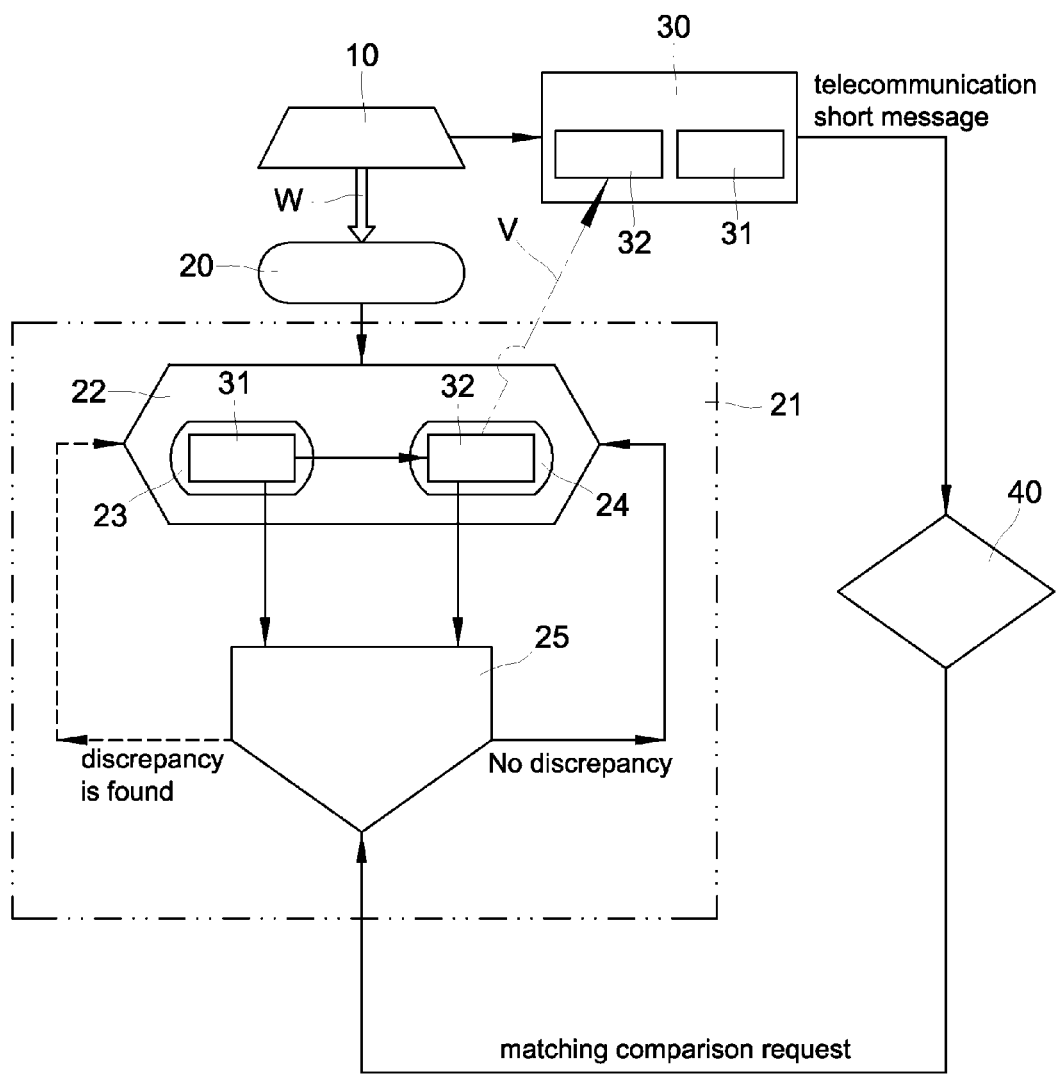
FIG. 3 is an operational block diagram for previous FIG. 2.

Please refer to FIGS. 2 and 3, which show a first exemplary embodiment of a method of identity authentication and fraudulent phone call verification by using an identification code of a communication device and a dynamic password, comprising following procedural steps:

a. For each access to a specific website 20 via Internet W, an Internet user 10 is caused to select a communication device 30 as a prerequisite and input a corresponding proprietary identification code 31 of the communication device into a field 23 for the identification code of the communication device that is included in a dynamic web-page 22 of the specific website 20 for which access is sought; if the Internet user 10 is unwilling to input the identification code of a communication device 31, it means that he/she has elected to give up the identity authenticating service on Internet W;

b. A website server 21 in the specific website 20 will immediately generate a corresponding dynamic password 32 and display it in a dynamic password field 24 of the dynamic web-page 22, and in the meantime will store both the identification code 31 of the communication device and the dynamic password 32 in an identifying and verifying database 25 of the website server 21 after having received the identification code of the communication device 31;

c. By viewing a display of the communication device 30 (vision V), the Internet user 10 can see and pick up the dynamic password 32 transmitted from the field for dynamic password 24 (as marked symbol V shown in FIG. 3) and voluntarily transmit it from the communication device 30 to a receiving terminal 40 designated by the specific website 20 via telephone short message mode; and d. After having received the telecommunication short message from the communication device 30, the receiving terminal 40 will actively sense the corresponding identification code 31 of communication device 30 and transmit it together with the dynamic password 32 included in the telephone short message to the identifying and verifying database 25 of the specific website 20 for matching comparison with counterparts of the identification code 31 and dynamic password 32 stored in the identifying and verifying database 25; If no discrepancy is found, an output representing the phrase "authentication is successful" or similar words will appear on the dynamic web-page 22 of the specific website 20; while if any discrepancy is found, an output representing the phrase of "authentication has failed" or similar words will appear in the same location.

In the above steps a, b and d, the communication device 30 is a cellular phone, and the corresponding identification code of communication device 31 is a cellular phone number of the communication device 31 or the data exiting in a Subscriber Identity Module (SIM) of the communication device 31.

In the above step c, the telephone short message mode can be replaced by a telecommunication voice/speech or image/video mode.

Moreover, in above step d, the telephone number of the receiving terminal 40 can be replaced by a telecommunication short code such that either the telephone number or the telecommunication short code is made available to the public via propagation of a media advertisement.

Therefore, when a Internet user 10 accesses the specific website 20 via the Internet W (for example an Internet shopping website), and he/she selects a legitimate cellular phone with a phone number of, by way of example, "123456789" as the communication device 30, then the required input for the corresponding proprietary identification code 31 of the communication device is "123456789." Upon input of the identification code "123456789," a website server 21 in the specific website 20 will immediately generate a corresponding dynamic password 32 (suppose "0987") and in the meantime store both the identification code 31 of communication device 30 and the dynamic password 32 in an identifying and verifying database 25 of the website server 21. Then, the Internet user 10 will see the dynamic password 32, "0987," displayed in the dynamic password field 24 of the dynamic web-page 22 of the specific website 20. At this moment, the Internet user 10 can transmit "123456789" as the identification code 31 of communication device 30 with "0987" as the dynamic password 32 from his/her communication device 30 to a receiving terminal 40 designated by the specific website 20 via telephone short message mode to enable identity authentication for accessing the Internet shopping website to start shopping. As a result, even a hacker who already knows that the cellular phone number of the target Internet user 10 is "123456789" still cannot pass the identity authentication because the hacker cannot easily get a cellular phone having the same identification code as "123456789" or the same Subscriber Identity Module (SIM) data for verification as the communication device 30. Thus, the hacker cannot pass the identity authentication to impersonate the Internet user 10 and access the target Internet shopping website for criminal purposes. Similarly, even a hacker that already intercepts the dynamic password 32 of the target Internet user 10 and knows that it is "0987" cannot know the identification code 31 of communication device 30 (or the data in a Subscriber Identity Module (SIM) of the communication device 30), further preventing the hacker from passing the identity authentication. Thus, the security level of the present invention is much higher than that provided by the conventional "dynamic password" authentication method, and therefore provides an easy and safe way to carry out Internet transactions for all Internet users.

Moreover, the dynamic password 32 of the present invention in the above step c is actively initiated by the Internet user 10 via his/her short message in a mobile telecommunication MO (Mobile Originated) Mode, with the feature of higher transmission priority than MT (Mobile Terminated) Mode. By means of active Mobile Originated (MO) Mode, the dynamic password 32 transmission result is shown directly on the cellular phone and the Internet user 10 knows the transmission result immediately. Consequently, the defects of authentication delay and authentication mistakes in the conventional dynamic password authentication method are easily solved by the present invention. Also, because the Internet user is not in the status of receiving the "OTP short message," there is no room for the attacker to send a fake "OTP short message" to conduct the fraudulent crime of "OTP short message phishing" to cheat the Internet user.

Figure 4:
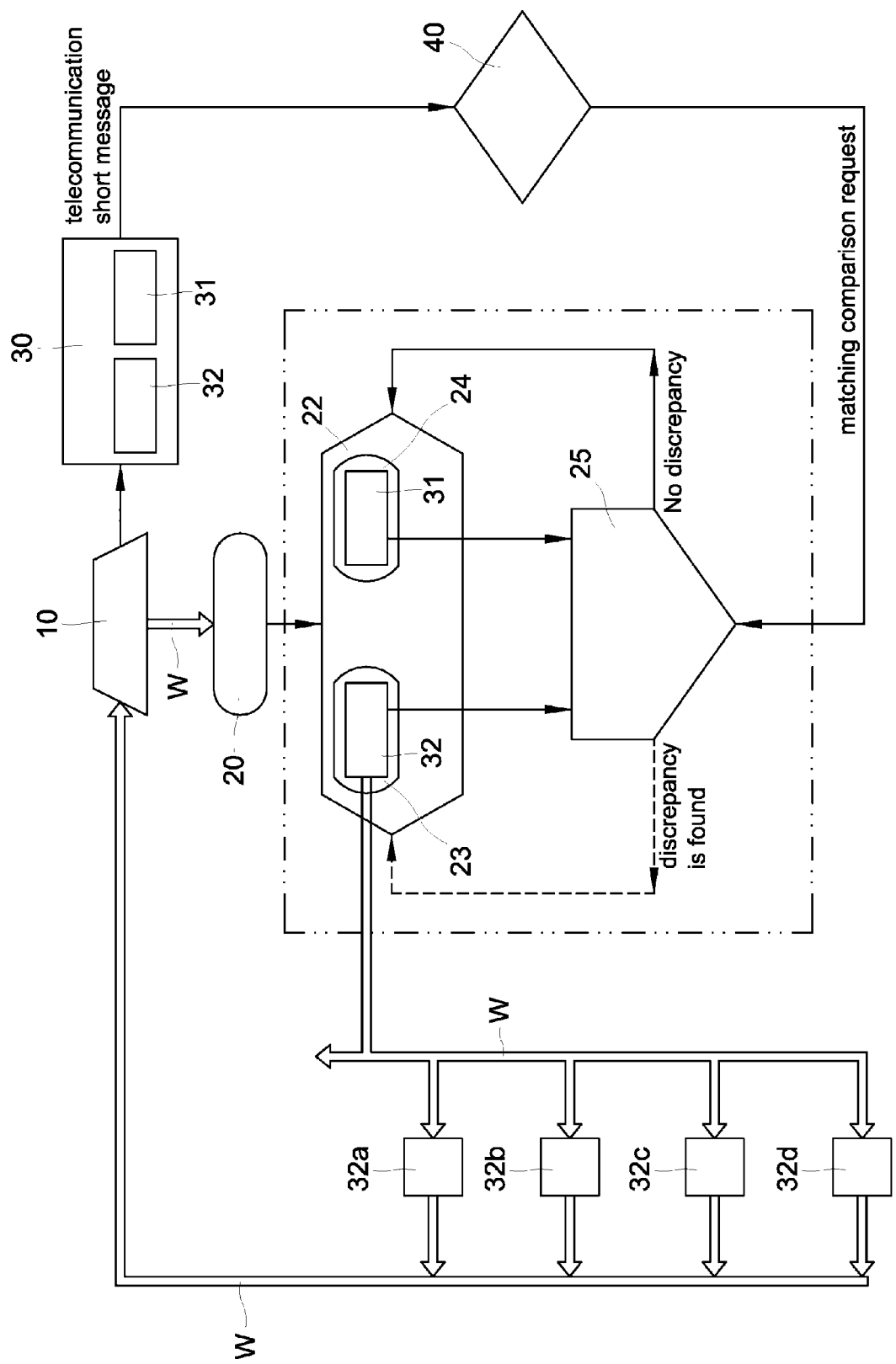
FIG. 4 is an operational block diagram of a second exemplary embodiment of a method of identity authentication and fraudulent phone call verification by using the identification code of a communication device and a dynamic password.

Please further refer to FIG. 4. Wherein in above step b, the dynamic password 32 display can replaced by an email 32a or a network communication voice/speech 32b or a telecommunication voice/speech 32c or a telephone short message 32d or the like to display and inform the Internet user 10.

Figure 5:
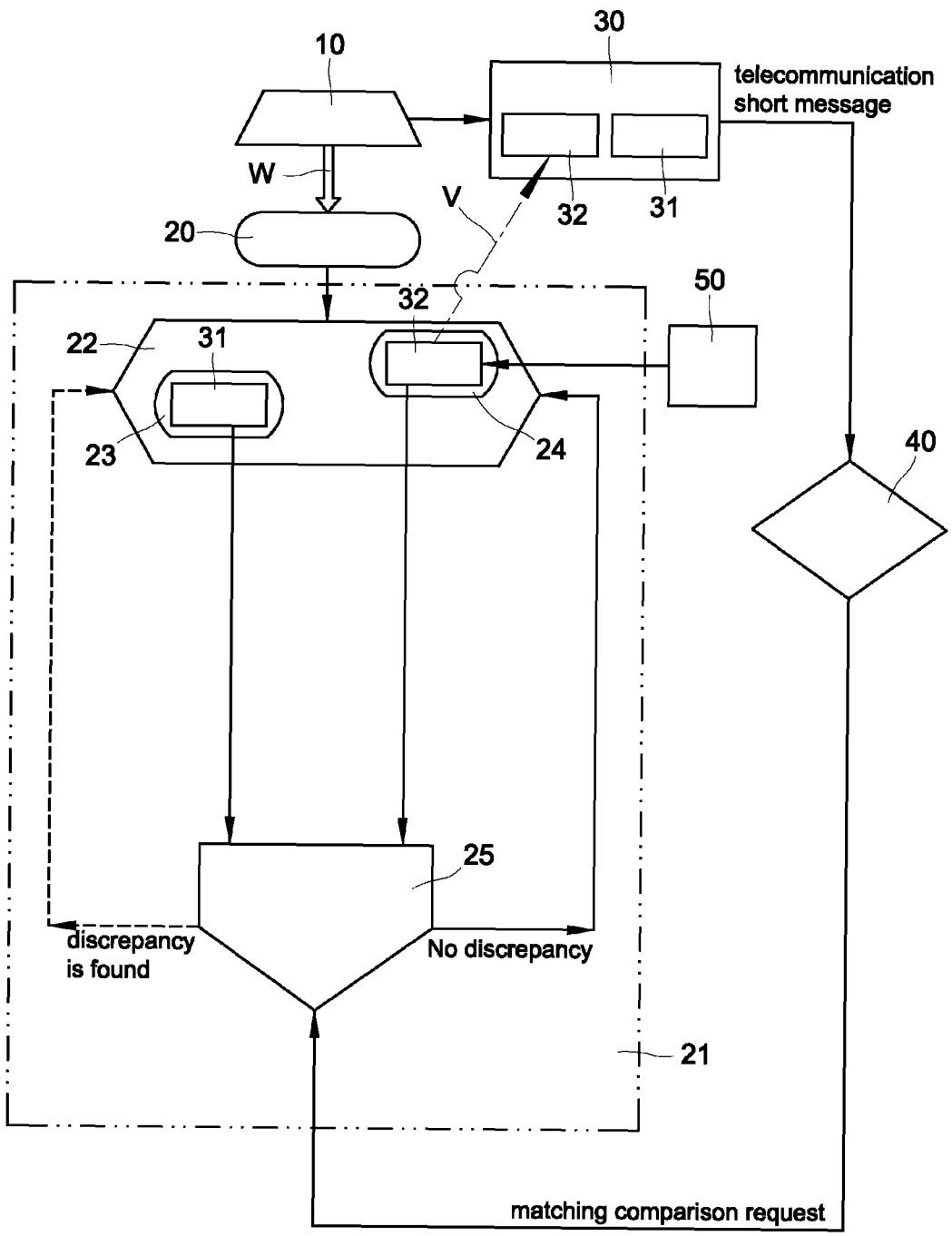
FIG. 5 is an operational block diagram of a third exemplary embodiment of a method of identity authentication and fraudulent phone call verification by using identification code of a communication device and a dynamic password.

Please further refer to FIG. 5, in which, in the above step b, the dynamic password 32 can further be generated by a conventional dynamic password generator 50 so that the Internet user 10 can see it using his or her vision V on the generator 50 to pick up the dynamic password 32, then voluntarily transmit it from the communication device 30 to a receiving terminal 40 designated by the specific website 20 via telephone short message mode.

Figure 6:
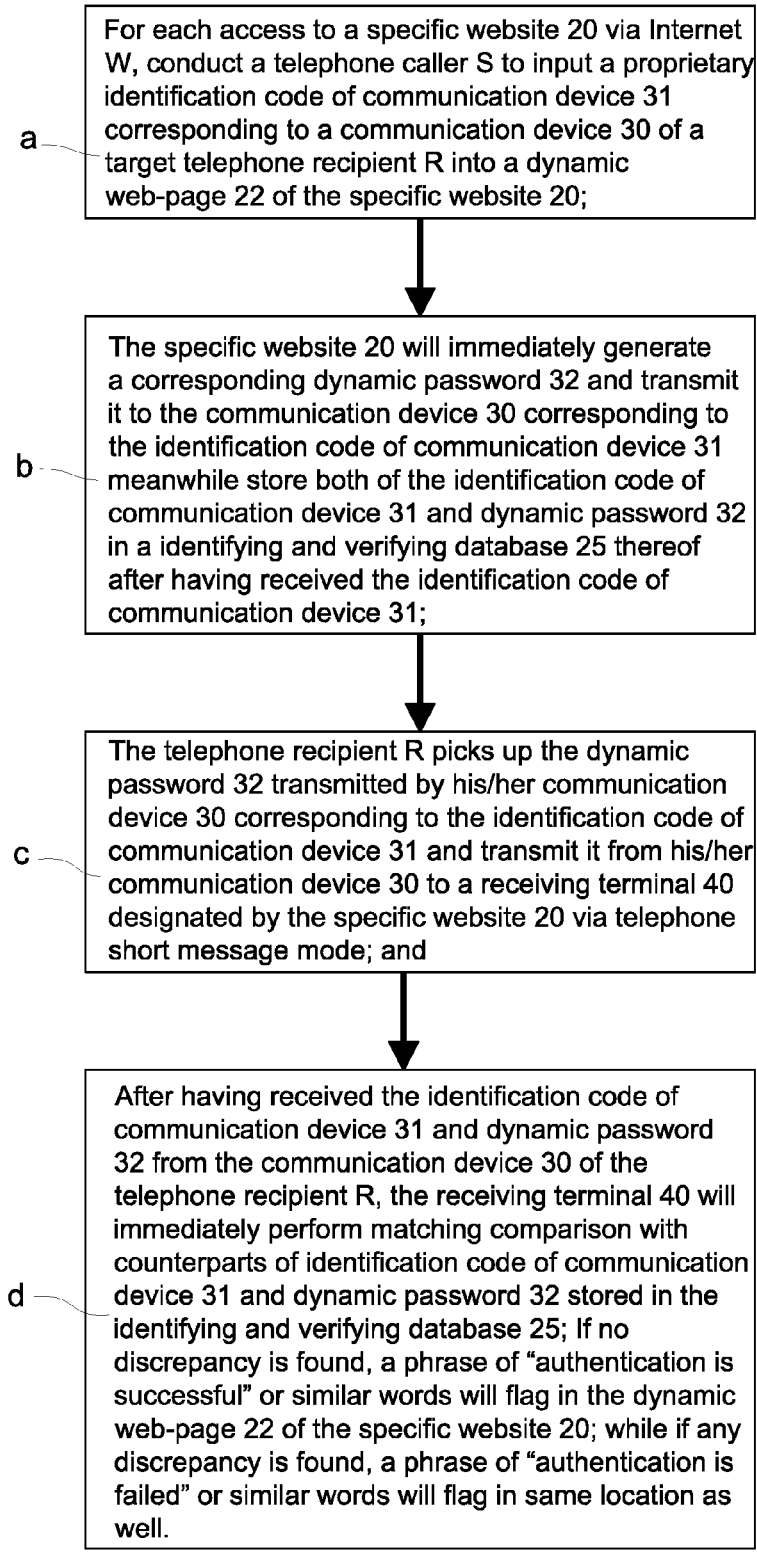
FIG. 6 is a flow chart showing procedural steps of a method for fraudulent phone call verification by using the identification code of a communication device and a dynamic password.

Please further refer to FIG. 6, which shows an alternative embodiment of a method of fraudulent phone call verifying by the identification code of a communication device and a dynamic password, which comprises the following procedural steps:

a. For each request for a telephone call recipient R to access to a specific website 20 via Internet W, a phone caller S inputs a proprietary identification code of a communication device 31 corresponding to a communication device 30 of the targeted telephone call recipient R into a dynamic web-page 22 of the specific website 20;

b. The specific website 20 will immediately generate a corresponding dynamic password 32 and transmit it to the communication device 30 corresponding to the identification code 31 and in the meantime store both the identification code 31 of the communication device 30 and the dynamic password 32 in an identifying and verifying database 25 of the specific website 20 after having received the identification code 31 of the communication device 30;

c. The telephone call recipient R picks up the dynamic password 32 transmitted by his/her communication device 30 corresponding to the identification code 31 of communication device 30 and transmits it from his/her communication device 30 to a receiving terminal 40 designated by the specific website 20 via telephone short message mode; and d. After having received the identification code 31 of communication device 30 and dynamic password 32 from the communication device 30 of the telephone call recipient R, the receiving terminal 40 will immediately perform matching comparison with counterparts of identification code 31 of communication device 30 and dynamic password 32 stored in the identifying and verifying database 25; If no discrepancy is found, a phrase of "authentication is successful" or similar words will appear in the dynamic web-page 22 of the specific website 20; while if any discrepancy is found, a phrase such as "authentication has failed" or similar words will flag the failure in the same location.

In the above step a, if the communication device 30 is a telephone in a fixed telephone network, the corresponding identification code of the communication device 31 may be the telephone number of the communication device, while if the communication device 30 is a cellular phone, the corresponding identification code of communication device 31 may be the cellular phone number or the data in a Subscriber Identity Module (SIM) of the communication device.

Moreover, in the above step b, the dynamic password 32 may alternatively be transmitted to the communication device 30 by an email 32a, a network communication voice/speech message 32b, a telecommunication image/video 32c, a telephone short message 32d, or the like, while in the above step c, the telephone short message mode can be replaced by a telecommunication voice/speech or image/video mode.

Still further, in the above step c, the telephone number of the receiving terminal 40 can be replaced by a telecommunication short code such that either the telephone number or the telecommunication short code is available to the public via propagation of a media advertisement.

Finally, those skilled in the art should recognize that the conventional dynamic password authentication method, and particularly one used in a traditional fixed-line telephone network, also has serious safety drawbacks because a conventional telephone network can be easily eavesdropped upon by criminals. This problem can further be solved by carrying out the identity authentication described herein via a cellular phone network secured by a Public Key Infrastructure (PKI), which is the basic framework of $3^{rd}$ generation (3G) mobile network, making eavesdropping extremely difficult When the scheme of identity authentication is operated via short message service (SMS) in a 3G mobile network by means of a "dynamic password" and an associated "identification code of communication device," and by setting the "telecommunication short code" as the SMS receiving terminal, an optimal identity authentication is obtained because the "identification code of the communication device" can never be tampered with in this "telecommunication short code" receiving design and no additional authentication infrastructure construction is needed. Therefore, the present invention can be quickly introduced into industrial applications of great value.

What is claimed is:

1. A method of identity authentication by using an identification code of a communication device and a dynamic password, comprising the steps of:

(a) for each access to a specific website via Internet, causing a network user to select the communication device and input the identification code of the communication device into a dynamic web-page of the specific website;

(b) in response to input of the identification code, a website server in the specific website generating the dynamic password and displaying the dynamic password in a dynamic password field of the dynamic web-page, and storing both the input identification code of the communication device and the displayed dynamic password in an identifying and verifying database of the website server;

(c) the network user viewing the dynamic password in the dynamic password field of the dynamic webpage and voluntarily transferring the dynamic password from the communication device to a receiving terminal designated by the specific website by inputting the dynamic password into the communication device for inclusion in a message, and causing the message to be transmitted by the communication device to the receiving terminal;

(d) after having received the message from the communication device, the receiving terminal actively detecting the identification code of the communication device and transmitting the identification code together with the dynamic password included in the message to the identifying and verifying database of the specific website for matching comparison with the stored identification code and the stored dynamic password stored in the identifying and verifying database, wherein if no discrepancy is found, successful authentication is indicated on the dynamic web-page of the specific website; while if any discrepancy is found, an failure of the authentication is indicated.

2. The method as claimed in claim 1, wherein the communication device in steps (a), (c) and (d) is a cellular phone, and the identification code of the communication device is a cellular phone number.

3. The method as claimed in claim 1, wherein the communication device in steps (a), (c) and (d) is a cellular phone, and the identification code of the communication device is data in a Subscriber Identity Module (SIM) of the cellular phone.

4. The method as claimed in claim 1, wherein the message transmitted by the network user from the communication device to the receiving terminal is a short message service (SMS) message.

5. The method as claimed in claim 1, wherein the message transmitted by the network user from the communication device to the receiving terminal is an email, a network communication voice/speech message, or a telecommunication image/video message.

6. The method as claimed in claim 1, wherein a telephone short message mode in step (c) is replaced by a telecommunication voice/speech or image/video mode.

7. The method as claimed in claim 1, wherein the telephone number of the receiving terminal in step (c) is aware by public via propagation of media advertisement.

8. The method as claimed in claim 1, wherein the telephone number of the receiving terminal in step (c) is replaced by a telecommunication short code such that the telecommunication short code is aware by public via propagation of media advertisement.

9. The method as claimed in claim 1, wherein the dynamic password in steps (b), (c) and (d) is further generated by a conventional generator of the dynamic password so that the network user can see the password dynamic by vision on the conventional generator of the dynamic password, then pick up the dynamic password and voluntarily transmit it from the communication device to the receiving terminal designated by the specific website via telephone short message mode.

10. A method of fraudulent phone call verification by using an identification code of a communication device and a dynamic password, comprising the steps of:
   (a) for each access to a specific website via Internet, causing a phone caller to input the identification code of the communication device corresponding to a communication device of a target telephone call recipient into a dynamic web-page of the specific website;
   (b) in response to input of the identification code of the communication device, the specific website generating the dynamic password and transmitting the dynamic password to the communication device corresponding to the input identification code, and storing both the input identification code and the dynamic password in an identifying and verifying database of the specific website after having received the input identification code;
   (c) the telephone call recipient viewing the dynamic password transmitted to the communication device, inputting the viewed dynamic password into the communication device for inclusion into a message, and transmitting the message including the dynamic password from the communication device to a receiving terminal designated by the specific website;
   (d) after having received the message, the receiving terminal reading the dynamic password included in the message and detecting the identification code of the communication device of the telephone call recipient, the receiving terminal then causing to be performed a matching comparison with the identification code and the dynamic password stored in the identifying and verifying database, wherein if no discrepancy is found, the specific website indicates that authentication is successful; and if any discrepancy is found, the specific website indicates authentication failure.

11. The method of fraudulent phone call verification by the identification code of the communication device and the dynamic password as claimed in claim 10, wherein the communication device in step (a) is a telephone in a fixed telephone network, and the identification code of the communication device is a telephone number of the telephone.

12. The method of fraudulent phone call verification by the identification code of the communication device and the dynamic password as claimed in claim 10, wherein the communication device in step (a) is a cellular phone, and the identification code of the communication device is a cellular phone number.

13. The method of fraudulent phone call verification by the identification code of the communication device and the dynamic password as claimed in claim 10, wherein the communication device in step (a) is a cellular phone, and the identification code of the communication device is data in a Subscriber Identity Module (SIM) of the cellular phone.

14. The method of fraudulent phone call verification by the identification code of the communication device and the dynamic password as claimed in claim 10, wherein the message is a short message service (SMS) message.

15. The method of fraudulent phone call verification by the identification code of the communication device and the dynamic password as claimed in claim 10, wherein the message is an email message, a network communication voice/speech message, or a telecommunication video/image message.

16. The method of fraudulent phone call verification by the identification code of the communication device and the dynamic password as claimed in claim 10, wherein the message in step (c) is a telecommunication voice/speech or image/video message.

17. The method of fraudulent phone call verification by the identification code of the communication device and the dynamic password as claimed in claim 10, wherein a telephone number of the receiving terminal in step (c) is made known to the public via propagation of a media advertisement.

18. The method of fraudulent phone call verification by the identification code of the communication device and the dynamic password as claimed in claim 10, wherein the receiving terminal in step (c) is identified by a telecommunication short code distributed to the public via propagation of a media advertisement.

* * * * *